O. L. SCOTT.
ROTARY INTERNAL COMBUSTION ENGINE.
APPLICATION FILED DEC. 18, 1917.

1,368,359.

Patented Feb. 15, 1921.
6 SHEETS—SHEET 5.

WITNESSES:
J. H. Herring
Thos. Castberg

INVENTOR
Oliver L. Scott.
BY Strong & Townsend
ATTORNEYS

O. L. SCOTT.
ROTARY INTERNAL COMBUSTION ENGINE.
APPLICATION FILED DEC. 18, 1917.
1,368,359.
Patented Feb. 15, 1921.
6 SHEETS—SHEET 6.
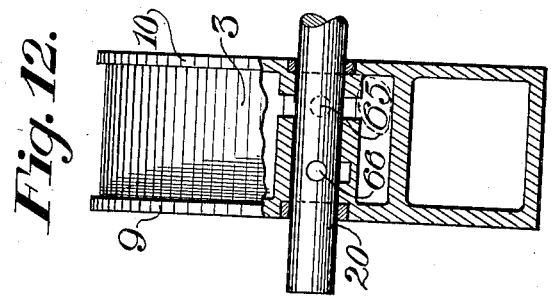
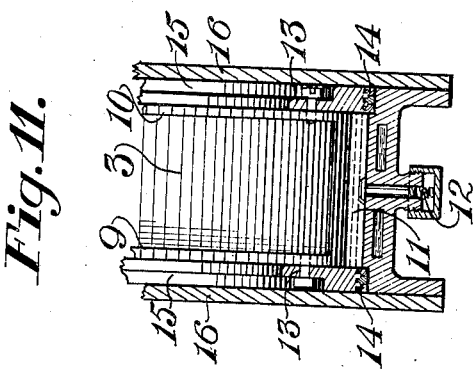
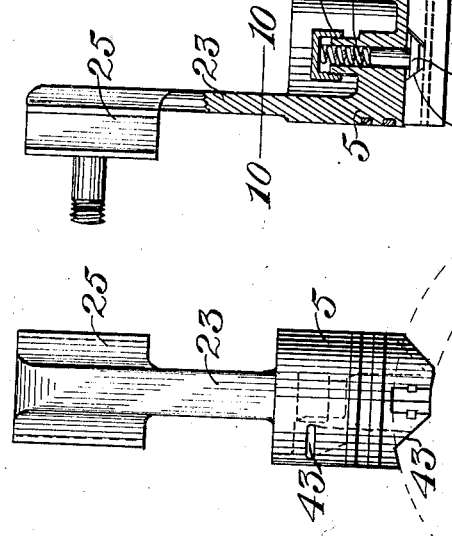
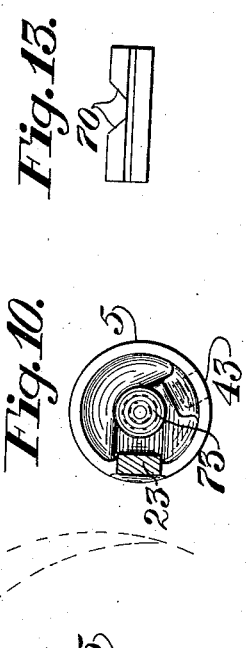
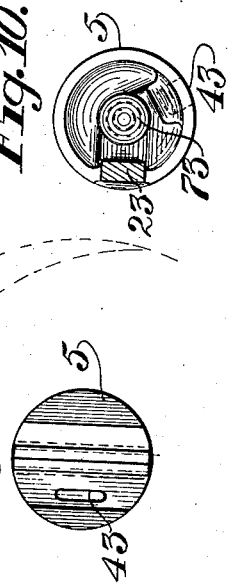
WITNESSES:
J. H. Herring
Thos Castberg
INVENTOR
Oliver L. Scott.
BY Strong & Townsend
ATTORNEYS

UNITED STATES PATENT OFFICE.

OLIVER L. SCOTT, OF SAN FRANCISCO, CALIFORNIA, ASSIGNOR TO ROTARY GAS ENGINE CO., OF SAN FRANCISCO, CALIFORNIA, A CORPORATION OF CALIFORNIA.

ROTARY INTERNAL-COMBUSTION ENGINE.

1,368,359. Specification of Letters Patent. Patented Feb. 15, 1921.

Application filed December 18, 1917. Serial No. 207,738.

*To all whom it may concern:*

Be it known that I, OLIVER L. SCOTT, a citizen of the United States, residing at the city and county of San Francisco and State of California, have invented new and useful Improvements in Rotary Internal-Combustion Engines, of which the following is a specification.

This invention relates to a rotary internal combustion engine, and particularly to improvements over my co-pending application entitled "Rotary motor," Serial Number 724,191, filed October 5, 1912.

One of the objects of the present invention is to provide a rotary internal combustion engine consisting of a suitably shaped casing, a rotor in the casing, a plurality of abutments radially positioned and reciprocal with relation to firing pockets formed in the rotor, and means exteriorly of the rotor for compressing a combustible charge; and, furthermore, to provide an automatically timed distributing valve through which the combustible charge may be admitted to the firing pockets of the rotor. Another object of the invention is to improve the general construction and arrangement of the parts to produce greater efficiency, longer life and general simplicity and stability. Further objects will hereinafter appear.

The invention consists of the parts and the construction and combination of parts as hereinafter more fully described and claimed, having reference to the accompanying drawings, in which—

Figs. 7 and 8 are side and end elevations respectively of the abutment.

Fig. 9 is a detail view of the abutment, partly in section.

Fig. 10 is a cross section on line 10—10 of Fig. 9.

Fig. 11 is a detail view, partly in section, of the main casing and the packing rings interposed between the rotor and the casing.

Fig. 12 is an end view of the rotor, partly in section.

Fig. 13 is a side elevation of one of the packing strips employed on the end of each abutment.

Figure 1:
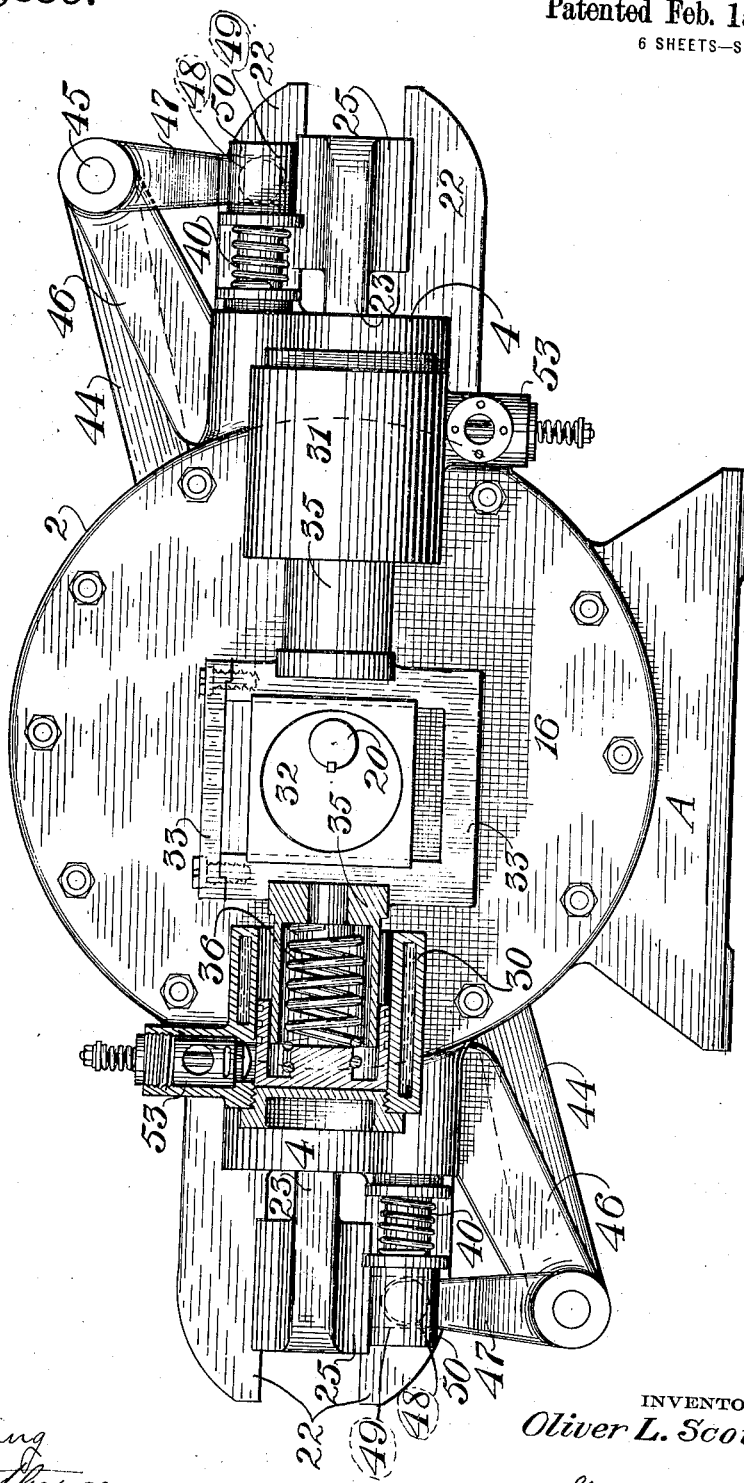
Figure 1 is a side elevation of the engine, partly in section.

Referring to the drawings in detail, A indicates a casing, the central portion of which is cylindrical shaped, as at 2, to receive a rotor 3. Each end of the casing is extended to form the cylinders 4 which are provided for the purpose of receiving a pair of abutment members 5 and 6. The abutment members are radially disposed with relation to the rotor and a pair of recesses or firing chambers 7 and 8 formed in the rotor, and are also adapted to be reciprocated at time intervals within the cylinders 4, as will hereinafter be described.

The rotor, as previously described, is cylindrical in shape and has a pair of firing chambers 7 and 8 provided with side walls 9 and 10. Each firing chamber is in this manner entirely inclosed, with the exception of the exterior face which opens through the rotor. This must be open to permit either abutment 5 or 6 to enter to assume the position shown in Fig. 2. Any suitable form of packing may be provided for the exterior face of the rotor and the interior of the cylindrical casing, but preferably the oppositely disposed packing strips 11 are mounted in guideways formed in the casing and backed by springs 12 to normally hold them in contact or in engagement with the rotor. These packing strips are sufficiently long to extend across the whole face of the rotor, thereby eliminating any danger of the strips dropping into either firing chamber as they pass by. Other means have been provided to prevent leakage of gas from the firing chambers around the side walls of the rotor. This is accomplished by securing to each side of the rotor a ring 13, between which and the casing proper is interposed a plurality of loosely mounted packing rings 14. Any oil or gas escaping from the rotor or the firing chambers formed therein pasing by the packing rings 13 and 14 will enter the chambers 15 which are formed on each side of the casing by securing covers or end plates 16 thereto. The spaces 15 will soon fill up with oil or gas and will consequently counterbalance any pressure formed in the firing chambers which might otherwise escape.

Reciprocal movement is transmitted at timed intervals to the abutment members 5 and 6 by means of a pair of eccentrics 17 and 18. These eccentrics are directly driven from a gear 19 secured upon the main driving shaft 20 which carries the rotor; said driving movement being transmitted from the gear 19 to gears 21 secured to each respective eccentric. The speed ratio between the gears is two to one, thus causing each abutment to reciprocate twice during each revolution of the rotor.

Each cylinder 4 is provided with a guide extension 22 for the reception of a pair of cross-heads 25, and each abutment is provided with an extension arm 23 which is secured to or formed integral with the adjacent cross-head. Each eccentric is in turn connected with the adjacent cross-head by means of a link 26, thus permitting the eccentric movement to be directly transmitted to reciprocate the connected abutments.

For the purpose of charging each firing chamber with a combustible mixture, a pair of compressors 30 and 31 has been provided. These are formed integrally with or suitably secured to one of the side plates 15 and are directly driven from the drive shaft 20 by means of an eccentric 32, secured upon the shaft and any suitable form of connecting straps 33. Mounted in each compressor is a piston 35. Each piston consists of an inner and an outer section, such as shown in Fig. 1, which are connected by a coil spring 36. This construction is provided for the purpose of permitting the exterior piston section to telescope with relation to the inner section 35, when a charge is being compressed between a piston and the head of a cylinder.

Figure 5:
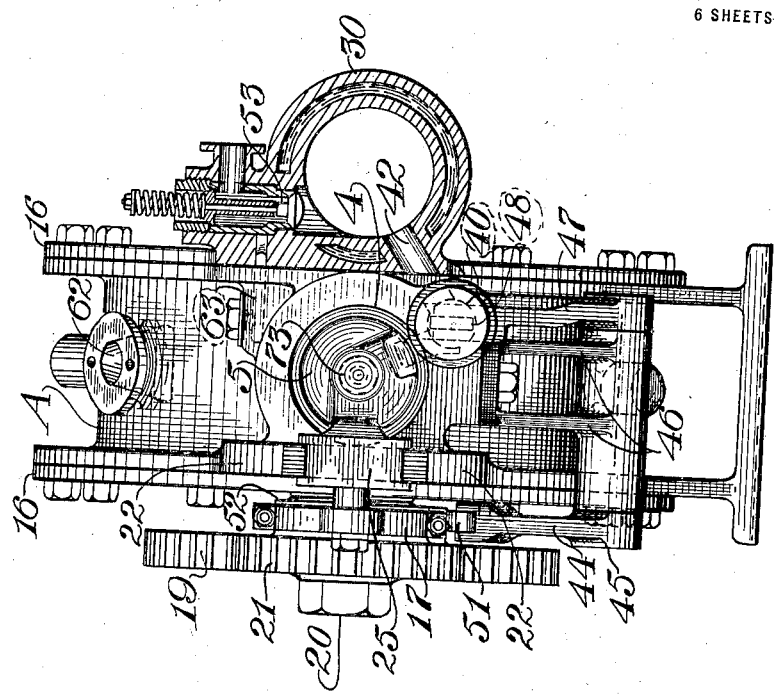
Fig. 5 is an end view, partly in section.
Figure 6:
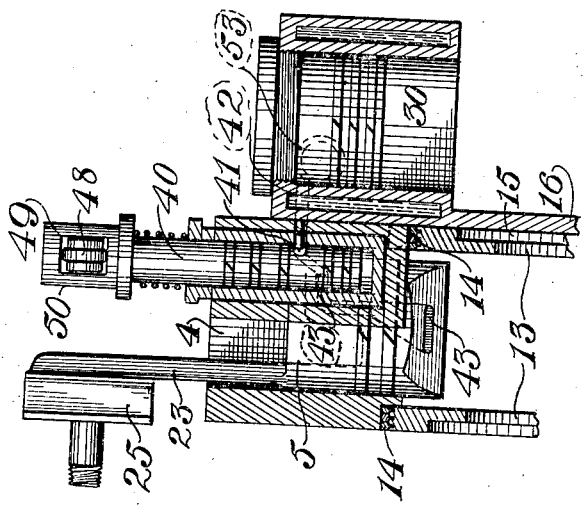
Fig. 6 is a detail view, in section, showing the relative position between the compressor, the distributing valve and the abutment.

Referring to Figs. 5 and 6, it will be seen that a piston valve 40 has been interposed between each compressor and the adjacent abutment. This valve is provided for the purpose of admitting the charge of combustible mixture compressed by the compressor into the firing chamber at certain timed intervals. This is accomplished by forming a port 41 in the piston valve which is adapted to register with a port 42 in the compressor and a port 43 in the abutment proper. The port 43 has one end opening through one side of the abutment and its other end opening directly through the end of the abutment, thus permitting the gas, when the several ports register, to pass from the compressor directly into the firing chamber. Means must, therefore, be provided for the purpose of reciprocating the piston valve and this is accomplished by providing a rocker-arm 44, secured on one end of shaft 45 journaled in a bracket arm 46 secured on the side of the main casing and by securing a second rocker-arm 47 on the opposite end of the shaft which carries a roller 48, so positioned as to project through a slot 49 formed in the outer end of an extension 50 formed on the piston valve, and by providing a second roller 51, carried by arm 44, which engages with a cam 52 secured on the drive-shaft intermediately of the main driving gear 19 and the casing.

There are two compressors provided, as previously described, and consequently two piston valves with connected operating mechanism. Each compressor and piston valve being mounted adjacent to the abutments in parallel position with relation to the same, the description of one will, therefore, apply to both.

The operation of the engine will be as follows: Each compressor is provided with an inlet valve 53 of suitable construction which is directly connected with a carbureter and a manifold (not here shown). The suction stroke of either compressor will thus cause the connected cylinder to become charged with a combustible mixture which is compressed upon the reverse stroke of the piston. The combustible charge cannot, however, leave the compressor until a firing chamber arrives at a certain position and the adjacent abutment has entered. The position of the cam 52 is, therefore, such that the rocker-arms 44 and 47 will be actuated to move the connected piston valve into a position where the several ports 41, 42 and 43 are brought into alinement. This takes place, as previously described, when the abutment has been projected into the firing chamber.

The gas under compression will then pass through the ports directly into the firing chamber and will here be ignited by any suitable form of ignition mechanism or the spark plugs 60, thus producing the impulse which drives the rotor. The rotating movement of the rotor in the direction of arrow $a$ will permit the ignited charge to expand and will necessitate retraction of the abutment the moment the end of the firing chamber turns into position. This is accomplished, as previously described, by means of the eccentrics directly driven from the main driving shaft by the connected cross-heads and the extensions 23 formed on the abutment. Continued rotation of the rotor will bring the firing chamber into alinement with either one or the other of a pair of oppositely disposed exhaust ports 62, which may open directly to the atmosphere or be connected with pipes for the purpose of carrying the exhaust to any point desired. A relief port 63 is also necessarily provided adjacent to each abutment for the purpose of relieving any compression which might take place in the rear portion of a firing chamber indicated at 64.

The rotor proper may be cooled in any suitable manner, but preferably by circulating water which enters through a port 65 and discharges through a port 66. The main cylinder casing A and extensions 4 may also be water-jacketed, in this manner permitting a perfect cooling of all the parts exposed to the heat of combustion and compression.

The telescoping construction of the compressor pistons is an important feature of the present invention as it is impossible to relieve the gas under compression until the discharge ports are brought into alinement by a movement of the adjacent piston valve. This takes place at the time when the compressor piston is at the end of its stroke and would necessitate a spacing between the end of a cylinder and the piston, if an ordinary piston were employed. The telescoping piston here shown, however, permits the exterior section to telescope or move back against the tension of the spring 36 to prevent undue compression of the gases and also to produce the space required for the gas before it is released. Registering of the ports permits the gas to immediately escape and also permits the exterior piston section to move back and expel every particle of gas. A complete discharge of a compressor cylinder is in this manner accomplished without unnecessary compression or waste of power.

Figure 2:
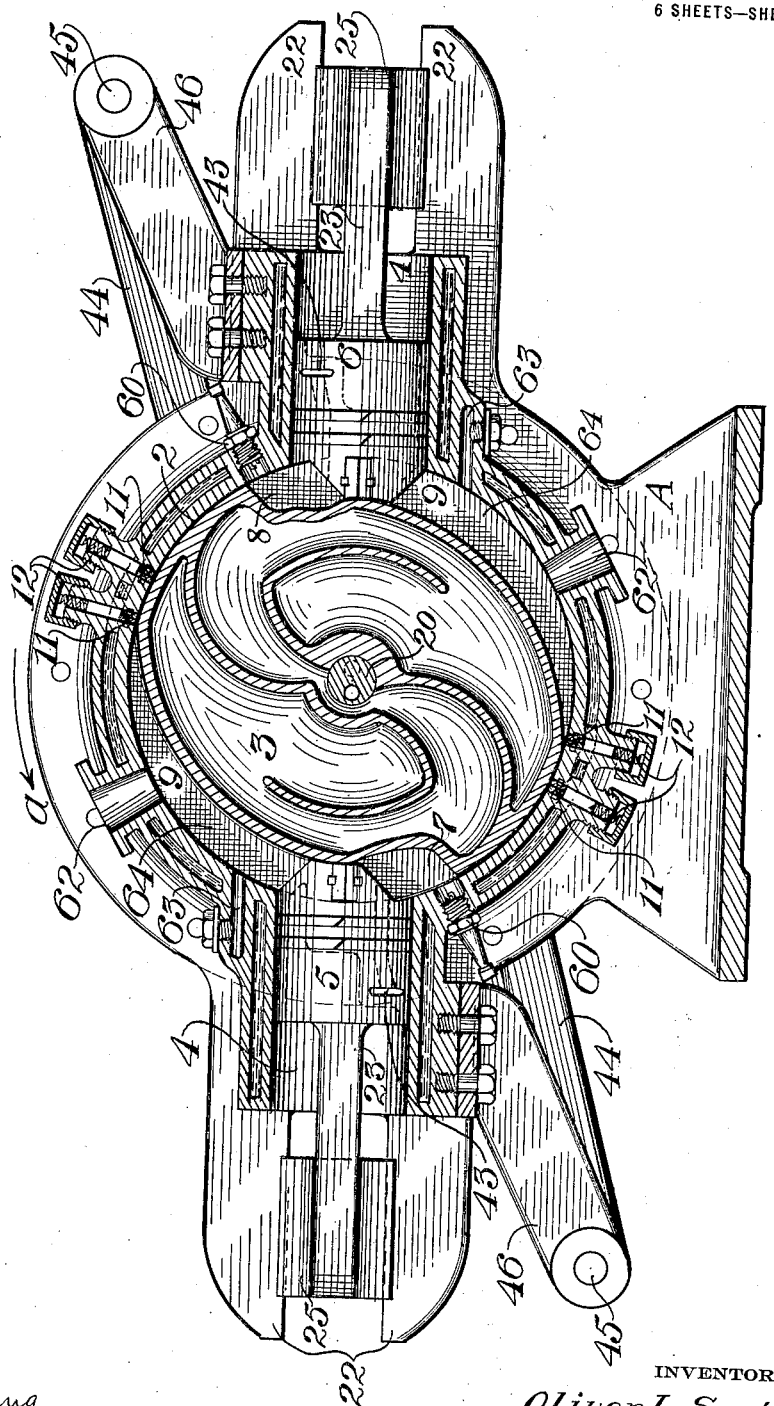
Fig. 2 is a central, longitudinal, vertical section.
Figure 3:
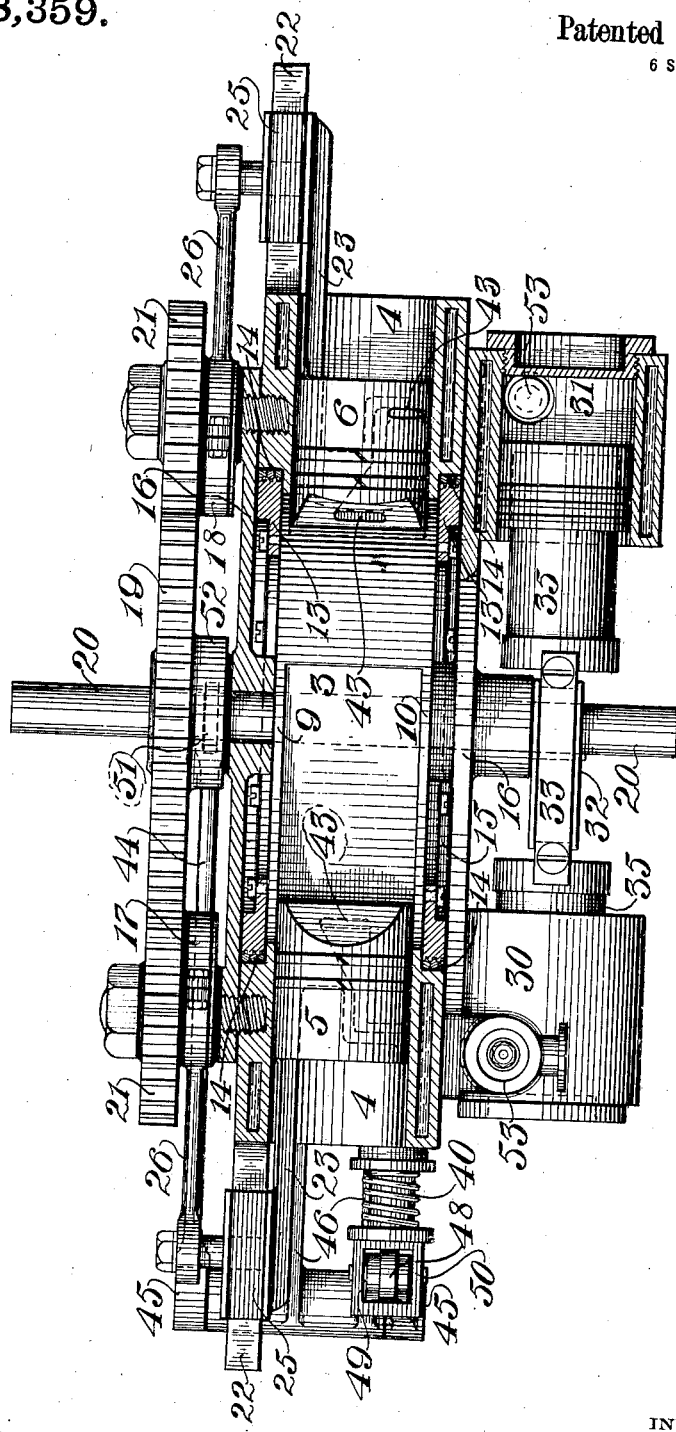
Fig. 3 is a central, horizontal, longitudinal section.
Figure 4:
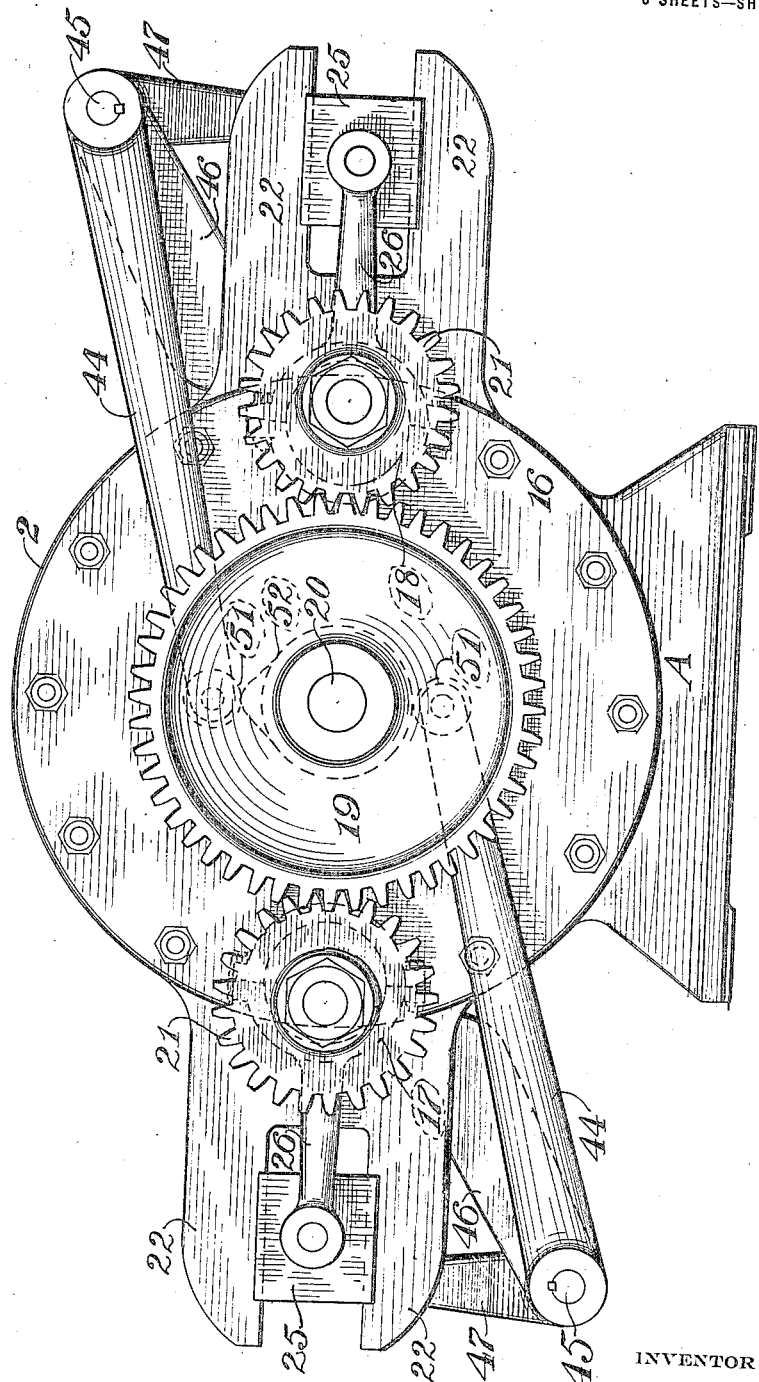
Fig. 4 is a side elevation of the engine, taken from the opposite side to Fig. 1, showing the relative position between the gears and the cam.

By referring to Figs. 7, 8, 9 and 10, it will be seen that each abutment is provided with piston rings to prevent the escape or leakage of gas through the cylinders 4 and that the end of each abutment is provided with packing strips similar to those indicated at 11, in Fig. 2, with the exception that the inner side of each packing strip is recessed and provided with inclined walls 70 which are engaged by a wedge 71, interposed between the packing strips, and a spring 72, the tension of which may be varied by means of a cap 73. The constant pressure of the spring against the wedge not only forces the packing strips down against the rotor, but also forces the strips endwise in both directions, as the wedge engages with the inclined wall of one strip on one side and with the inclined wall of the other strip on the other side, thus not only forcing the strips downwardly but also outwardly or endwise. This, together with the strips 11 and the packing rings 13 and 14, prevents the escape of gases and lubricating oil and consequently increases the general efficiency and life of the engine.

Having thus described my invention, what I claim and desire to secure by Letters Patent is—

1. In an internal combustion engine, a casing having an outwardly extending abutment cylinder and a pair of guide extensions projecting beyond the latter, a rotor journaled in the casing, an abutment slidably arranged in the cylinder for coöperation with the rotor, a cross-head slidable between the guide extensions and connected to the abutment, a gear fixed on the shaft of the rotor, an eccentric driven by said gear, and a link connecting the cross-head to the eccentric.

2. In an internal combustion engine, a cylinder, a rotor mounted in the cylinder having a plurality of firing chambers formed in its exterior surface, a plurality of abutment members carried by the cylinder, means actuated by the rotor for transmitting a reciprocating movement to the abutment members to move the same at timed intervals into and out of the firing chambers, a compressor operable in conjunction with each abutment member to deliver a combustible charge to a registering firing chamber, a valve operable in conjunction with each abutment member, each valve having a port formed therein adapted to register at one end with a discharge port in an adjacent compressor and at the other end with an inlet port formed in a coöperating abutment member, and means actuated by the rotor for reciprocating each valve at time intervals to move the valve ports into and out of register with the other ports to time the admission of the combustible charges.

3. The combination with the rotor and the main cylinder in which it is mounted, of a pair of secondary cylinders formed on the main cylinder and guide extensions projecting beyond each secondary cylinder at one side, said cylinders being radially disposed with relation to the center of the main cylinder, a piston-shaped abutment member reciprocally mounted in each secondary cylinder for movement into and out of engagement with the rotor and provided with an arm extending longitudinally outwardly and terminating in a cross-head slidably engaged in the adjacent guide extensions; means for admitting an explosive charge under pressure, means connected with each cross-head for moving the abutment member, and means for igniting each charge.

4. The combination with the rotor and the main cylinder in which it is mounted, of a pair of secondary cylinders formed on the main cylinder, said cylinders being radially disposed with relation to the center of the main cylinder, a piston-shaped abutment member reciprocally mounted in each secondary cylinder adapted to move into and out of engagement with the rotor, means for admitting an explosive charge under pressure through each abutment member, means for igniting each charge, piston rings surrounding each abutment member, a pair of packing strips mounted on the inner end of each abutment, and a single means for enforcing said strips outwardly and endwise.

5. In an internal combustion engine, a casing having oppositely extending abutment cylinders, a rotor journaled in the casing and formed with peripheral explosive chambers, abutments slidable in their cylinders for entrance into the explosive chambers of the rotor, transversely slidable packing members in the inner ends of the abutments, said packing members having wedge-shaped recesses in their rear edges, and spring-pressed cam members carried by the abutments and engaging in the recesses of the packing members to urge them laterally.

6. In an internal combustion engine, a casing having oppositely extending abutment cylinders, a rotor journaled in the casing and formed with peripheral explosive chambers, abutments slidable in their cylinders for entrance into the explosive chambers of the rotor, each abutment having a passage leading from its inner end through one side thereof, a compression cylinder for each abutment cylinder, pistons operable in the compression cylinders to compress the combustible mixture, a valve chamber interposed between each compression cylinder and its abutment and communicating therewith, a reciprocatory valve in each valve chamber having its outer end slotted, a bracket mounted on each abutment cylinder, a rock shaft journaled in each bracket, a cam-oscillated arm fixed on each rock shaft, a second arm fixed on each shaft and engaged in the slotted outer end of the adjacent valve, and means for reciprocating the abutments.

7. In an internal combustion engine, a casing having a cylindrical chamber formed therein, a pair of cylindrical extensions on the casing, one on each side of the cylindrical chamber, a rotor mounted in said chamber having a pair of firing pockets formed therein, a driving shaft extending through the rotor, an abutment member in each extension cylinder, a gear wheel journaled adjacent to each of said cylinders, an eccentric driven by each gear, a gear secured on the driving shaft and intermeshing with the said gears, a connection formed between each abutment and the eccentrics, whereby a reciprocating movement is transmitted to move the abutments into and out of the firing pockets, and means for charging the firing pockets with a combustible mixture at timed intervals during each revolution of the rotor.

8. In an internal combustion engine, a casing having oppositely extending abutment cylinders, a rotor journaled in the casing and formed with peripheral explosive chambers, abutments slidable in their cylinders for entrance into the explosive chambers of the rotor, each abutment having a passage leading from its inner end through one side thereof, a compression cylinder for each abutment cylinder, pistons operable in the compression cylinders, each piston having a yieldably mounted head adapted to yield when the side port of the abutment is not in a position to admit a compressed charge into the explosive chambers, and means for sliding the abutments.

In testimony whereof I have hereunto set my hand in the presence of two subscribing witnesses.

OLIVER L. SCOTT.

Witnesses:
JOHN H. HERRING,
FRANCES V. COLE.